Patented July 18, 1944

2,354,172

UNITED STATES PATENT OFFICE 2,354,172

OPERATION OF ANION-EXCHANGE UNITS

Robert J. Myers, Rydal, and Donald S. Herr, Philadelphia, Pa., assignors to The Resinous Products & Chemical Company, Philadelphia, Pa., a corporation of Delaware No Drawing. Application July 16, 1942, Serial No. 451,224

4 Claims. (Cl. 210—24)

This invention deals with a method of regenerating an anion exchange material, particularly anion exchange material used in conjunction with a cation exchange material for removing salts from aqueous systems (i. e., desalting).

It was shown by the work of Adams and Holmes that dissolved solids in water can be removed by passage over a base exchange material in its acid form followed by passages over an anion exchange resin in its basic form. The base exchange material in its acid or hydrogen form effectively absorbs metal ions and replaces them with hydrogen ions, thus yielding free acids corresponding to the anions of the originally dissolved salts. These acids are then absorbed by the so-called anion exchange resins with the result that the water is essentially desalted. Such water has been termed "pseudo-distilled water" and for practical purposes is equivalent to distilled water.

As the water being treated runs through the two types of exchange materials, these materials become saturated with respect to one or more of the dissolved ions and it becomes necessary to revivify or regenerate the exhausted or partially exhausted exchange agents. The cation exchange agent may be regenerated with a dilute solution of an acid, such as hydrochloric, sulfuric, acetic or the like, while the anion exchange resin material may be regenerated with an alkaline solution, such as a dilute solution of sodium or potassium hydroxides, ammonium hydroxide, sodium carbonate, etc. It is then necessary to rinse the regenerated exchange agents to remove free acid and free alkali respectively. This is readily accomplished in the case of the cation exchange materials with raw water, which may be discarded, but rinsing cannot be so readily accomplished in the case of the regenerated anion exchange materials, since the alkaline earths in the raw water react with the free alkali and cause undesirable deposition of gelatinous material in the exchange bed. The use of desalted water for rinsing is obvious and is effective, but uneconomical. It has been proposed to use for the rinsing of the regenerated anion exchange material water which has been softened by exchange of calcium and magnesium for sodium ions. This method, however, suffers from several disadvantages. Softened water is generally alkaline or contains sodium salts and is not fully effective in ridding the alkaline anion exchange agents of alkali, requiring excess quantities to bring the regenerated anion exchange bed to a usable state. This difficulty may be partly overcome by using rinse water obtained by operating a cation exchange bed partly in the sodium and partly in the hydrogen form. The comparable effect may be obtained with effluent from cation exchange material which has been used in the hydrogen form, but which has been used until the effluent therefrom contains alkali metal ions. In either case, however, the usual rinse water from a softened natural water suffers from the disadvantage that it contains a high proportion of sulfates which are "split" to a greater extent than other salts by the anion exchange material. The most efficient and powerful anion exchange agents have the most marked tendency to split sodium sulfate and yield an alkaline solution. Thus these methods fail to rinse the regenerated anion exchange bed free from alkali.

It is now found that improved operation of an anion exchange unit is obtained by revivifying anion exchange material following saturation with acid by use of an alkaline solution, and then rinsing with so-called "over-run" or effluent obtained after the anion-exchange material has become saturated with acid.

The over-run obtained with the average water supply contains a small amount of hydrochloric acid or a small amount of hydrochloric acid and a lesser amount of sulfuric acid. By the use of this slightly acidified water as a rinsing agent the alkali from the regeneration step is rapidly and completely washed away with a minimum of rinse water. Since the rinse water forms primarily alkali chlorides, and since these chlorides have a minimum tendency to be split by the anion exchange material, there is practically no opportunity for free alkali to appear in treated water from the regenerated material.

In operating an anion exchange unit for the removal of acid, either as such or as a result of the exchange of hydrogen for metal ions, the water drawn from a properly prepared unit remains essentially neutral until the anion exchange material approaches saturation. At this point acid beings rather suddenly to appear in the effluent, as is readily detected by a change in pH. In accordance with this invention the effluent should then be set aside until sufficient of the over-run is on hand for rinsing as outlined above.

The same effect may be had by the use of multiple exchange units. In such a case the "over-run" from an exhausted anion exchange unit may be run directly into the bed being regenerated.

As an anion exchange material there may be used any of the insoluble synthetic resins or modified natural materials, such as casein or leather, which have free basic groups. The groups are generally amino groups which absorb acids. Typical anion exchange resins are prepared from metaphenylene diamine by reaction with formaldehyde, or from polyalkylene polyamines and polyhalides, or from a methylol-forming phenol, formaldehyde, and a non-aromatic primary or secondary amine, particularly a polyalkylene polyamine, such as tetraethylene pentamine, diethylene triamine, dipropylene triamine, or the like. Resins of the last general type which are particularly effective as anion exchange resins are described in applications having Serial Nos. 387,679, 387,683, 387,684, 387,685, 397,686, 387,687, 387,688, all filed April 9, 1941.

As a cation exchange material there may be used a mineral type agent which is capable of use in its acid form or preferably an organic cation exchange agent, such as a sulfonated organic solid, including lignin, coal, charcoal, cellulose, or the like, or a cation exchange resin, such as a sulfited quebracho-formaldehyde condensate, a sulfonated phenol-formaldehyde condensate, or similar material. The cation exchange materials are converted to their hydrogen form by treatment with a dilute acid. They may then be rinsed to remove excess acid solution.

Details of the process herein described are given in the following examples:

*Example 1.*—A column was filled with about 230 cc. of a gelled and heat-hardened resin made from phenol, formaldehyde, and tetraethylene pentamine. There was then run through the column a solution containing 500 parts per million of hydrochloric acid. The flow of water from the column was essentially neutral until the "break-through," showing complete absorption of the acid. After the break-through occurred, the acidic solution was passed through the column, but collected separately until 6000 cc. of over-run had been collected. The pH of the over-run was 1.93. The column was then back-washed and regenerated by passage therethrough of a 4% solution of soda ash. The over-run was then passed through the column until the alkali was swept from the column. Less than 1300 cc. of rinse water was required to free the resin from alkali. On the other hand, when the same volume of resin was saturated with the solution of acid, regenerated with the 4% soda ash solution, and rinsed with distilled water, over 2000 cc. of water was required for rinsing away free alkali. The use of over-run water in this case not only avoided the necessity of using specially desalted water or distilled water, but reduced both the amount of rinse water required by over 35% and the time needed for regeneration.

*Example 2.*—For removal of salts from city water apparatus was provided consisting of a cation exchange unit and an anion exchange unit together with the requisite connections. The cation exchange unit consisted of a cylinder having a four inch internal diameter packed to a depth of twenty-six inches with a heat hardened resin made from phenol, sodium sulfite, and formaldehyde and converted to its hydrogen form with dilute hydrochloric acid. The anion exchange unit consisted of a similar cylinder packed to the same depth with a gelled and heat hardened resin made from phenol, formaldehyde, and tetraethylene pentamine. A water containing 3 grains of calcium and magnesium hardness, 80 parts per million of total cations (sodium, calcium, potassium, magnesium, etc.), 35 parts per million of sulfate ions, 10 parts per million of chloride ions, and traces of bicarbonate, was passed through the apparatus. The effluent from the cation exchange unit had a pH of 3.2 and contained no cations other than hydrogen. After this water was passed through the anion exchange unit, it was essentially neutral and was free from chloride and sulfate until this exchange bed became saturated. Thereupon the pH of the effluent began to fall rather suddenly. The effluent was at once separately collected until a total of 8 gallons had been set aside. This water had a pH of 3.6. The anion exchange material was then regenerated with 8.7 gallons of a 4% solution of sodium carbonate. The regenerated material was then rinsed with the 8 gallons of over-run, whereupon the effluent had a pH below 8. It was found that when desalted water was required to rinse regenerated material 13.5 gallons of water was required to bring the effluent to a pH of 8. The use of over-run from the anion exchange unit resulted in a marked saving of time and water.

We claim:

1. In the process of removing dissolved salts from water by passage of salt-containing water through a cation exchange material in its hydrogen form, subsequent passage through an anion exchange resin in its basic form until said exchange material and resin fail to remove the salt components and the effluent from the anion exchange resin becomes acidic, and regeneration of said spent exchange material and resin, the spent anion exchange resin being regenerated with an aqueous alkaline solution, the improvement which comprises continuing the passage of the water being desalted through said material and resin to give an acidic effluent from spent anion exchange resin, treating the spent anion exchange resin with an aqueous alkaline solution to regenerate said resin, and rinsing said solution from the regenerated resin by means of acidic effluent from said spent anion exchange resin.

2. In the process of removing dissolved salts from water by passage of salt-containing water over a cation exchange material in its hydrogen form, subsequent passage over an anion exchange resin from a gelled and heat-hardened phenol-formaldehyde-polyalkylene polyamine condensate in basic form until said material and said resin fail to remove salt components and become spent, and regeneration of the spent exchange material and resin, the improvement which comprises continuing the passage of the water being desalted through said material and said resin to give an acidic effluent from the anion exchange resin and to render said exchange resin acidic, treating the acidified anion exchange resin with an aqueous alkaline solution to regenerate said resin, and rinsing said solution from the regenerated resin with acid effluent from said spent anion exchange resin.

3. In the process of removing dissolved salts from water by passage of salt-containing water over cation exchange material in its hydrogen form, subsequent passage over anion exchange resin containing basic amino groups until the water passed thereover becomes acidic, and regeneration of the spent exchange material and resin, the improvement which comprises continuing the passage of salt-containing water through said material and said resin until water treated with the anion exchange resin remains acidic, regenerating the spent cation exchange material with a dilute acid and flushing it with water, regenerating the spent anion exchange resin with an aqueous solution of sodium carbonate, and rinsing the regenerated anion exchange resin with acidic water from said spent anion exchange resin to remove the regenerating solution therefrom.

4. In the process of removing acid from dilute solutions thereof by passage over an anion exchange resin in its basic for until the exchange resin becomes saturated with respect to the acid and regenerating the used anion exchange material with an alkaline solution, the improvement which comprises continuing the passage of acidic solution to provide an acidic overrun, regenerating the anion exchange resin with an alkaline solution, and rinsing said regenerated resin with said overrun.

ROBERT J. MYERS.
DONALD S. HERR.